Jan. 18, 1927.
R. B. BUKOLT
1,614,822
SCOOTER
Filed July 20, 1925
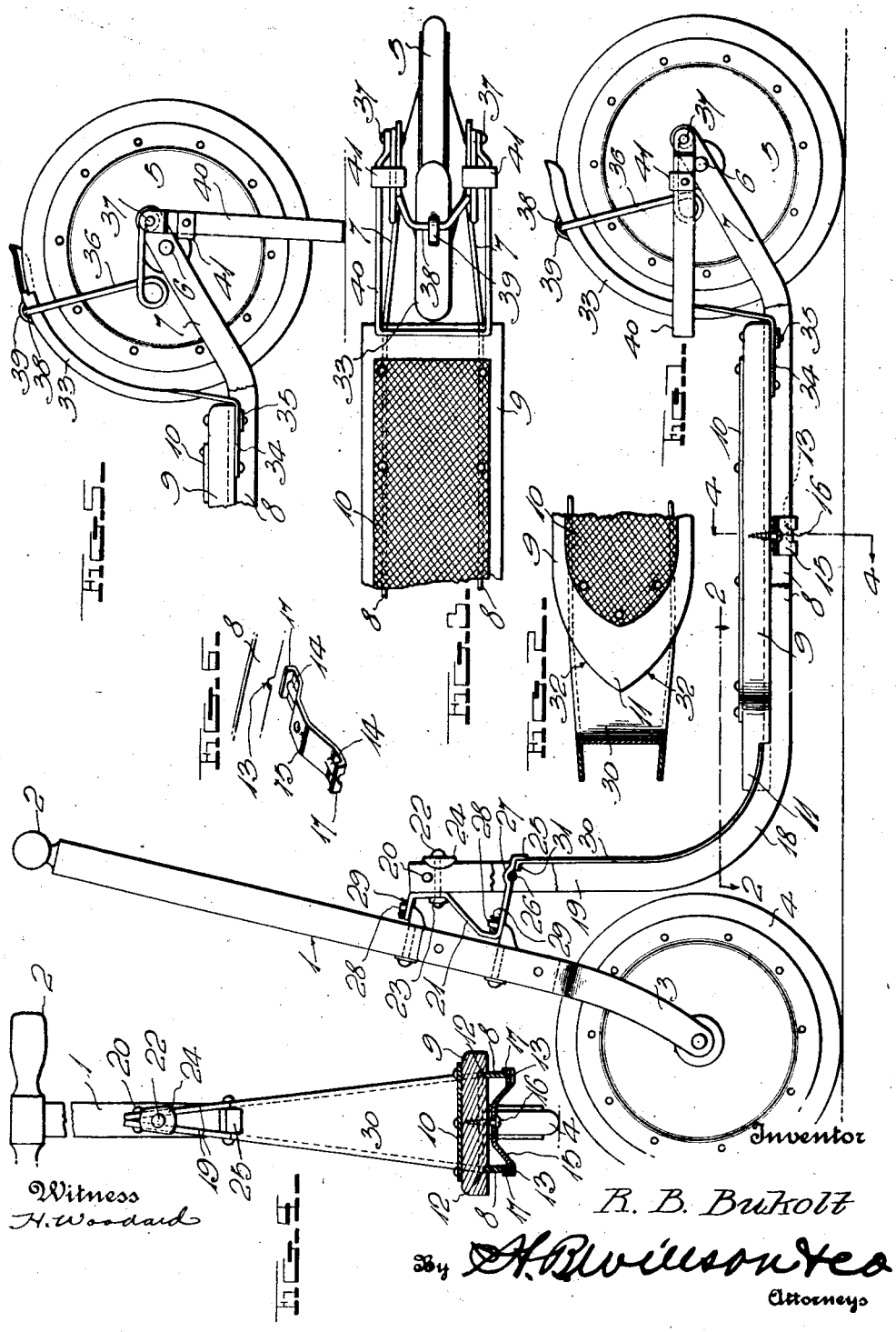
Witness
H. Woodard
Inventor
R. B. Bukolt
By H.B.Wilson&co
Attorneys Patented Jan. 18, 1927.

1,614,822

UNITED STATES PATENT OFFICE.

ROMAN B. BUKOLT, OF STEVENS POINT, WISCONSIN.

SCOOTER.

Application filed July 20, 1925. Serial No. 44,845.

My invention relates to improvements in children's vehicles of the type commonly known as scooters. Devices of this class commonly employ a wheeled steering column, a rear wheel, a frame supported at its back end by the rear wheel and pivoted at its front end to the steering column, and a foot-board carried by this frame, and it is the principal aim of my invention to provide a generally improved device of this character.

In carrying out the above end, further objects are to provide a front fender plate and to make unique provision for securing it in place; to provide novel means for connecting the foot-board with the frame structure; to provide a combined rear fender and brake; and to devise a novel combination brake actuator and stand, the latter being operable when swung downwardly, to support the scooter in a vertical position.

With the foregoing and minor objects in view, the invention resides in the novel subject matter hereinafter described and claimed, the description being supplemented by the accompanying drawing.

Figure 1 is a side elevation partly broken away.

Figure 2 is a detail horizontal sectional view on line 2—2 of Fig. 1.

Figure 3 is a top plan view of the rear portion of the scooter.

Figure 4 is a vertical transverse section as indicated by line 4—4 of Fig. 1.

Figure 5 is a fragmentary side elevation partly broken away and in section showing the combined brake actuator and stand positioned for use as a stand.

Figure 6 is a detail perspective view showing more particularly the means for securing the foot-board to the frame.

The drawing above briefly described may be considered as disclosing the preferred forms of the several unique features embodied by the improved scooter, but it is to be understood at the outset, that the invention is not restricted to the exact details shown, even though such details will be rather specifically described, hereinafter.

The numeral 1 designates a steering column embodying a handle 2, a fork 3 and a front wheel 4, the latter being preferably rubber-tired and mounted on roller bearings. A similar wheel 5 is provided at the rear end of the scooter, and the axle 6 of this wheel 5 supports the inclined rear ends 7 of a pair of longitudinal frame-forming bars 8 which underlie and support a foot-board 9, the latter being by preference provided with a rubber covering 10 on its upper side. The front end 11 of this foot-board is preferably pointed as shown, and the lower side of said board is formed with longitudinal grooves 12 which receive the upper edges of the bars 8. At suitable points, the lower edges of these bars are formed with notches 13, said notches receiving lugs 14 on a transverse clamping member 15 which underlies the bars 8. The intermediate portion of this clamping member is bowed upwardly and secured by a screw or the like 16 to the foot-board 9 and the ends of said member are preferably turned upwardly as at 17 to provide abutments engaging the outer sides of the bars 8. These abutments positively prevent spreading of the bars 8 and they also hold the clamping member 15 against canting, about the fastener 16, as a pivot, when driving screw 16.

The front ends of the bars 8 curve upwardly as at 18, in front of the foot-board 9 and then project vertically upward as at 19, the upper extremities of the portions 19 being secured together by a rivet or the like 20. An angular bracket 21, shaped substantially in the form of a figure 2, has its upper portion secured to the front ends of the bars 8, by a rivet 22 and approximate washers 23 and 24, through which said rivet passes. The lower end of this bracket passes rearwardly between the portions 19 of the bars 8 and has its rear extremity directed downwardly to form a lug 25 spaced slightly behind the rear edges of said portions 19. A rivet 26 secures these portions against the opposite edges of the bracket and the latter is preferably formed with an upwardly bowed seat 27 engaging this fastener. The bracket 21 is suitably pivoted to the steering column 1, for instance by studs 28 carried by said column, received in openings in the bracket and held against removal from said openings by cotter pins or the like 29.

A front fender plate 30 contacts with the rear edges of the upturned ends of the bars 8, the upper end of said fender plate being held between said edges and the lug 25, and being provided with a forwardly projecting tongue 31 received between the bar portions 19, so that said plate is held against lateral shifting. The lower end of the plate 30 is rearwardly directed and is formed with a notch 32 receiving the pointed front end 11 of the foot-board 9. When assembling the device, the plate 30 is properly positioned before the foot-board 9 is secured in place. Then, when the latter is tightly forced forwardly, it abuts the plate 30 and effectively holds it in proper engagement with the upturned bar ends, the lug 25, and the adjacent portion of the bracket 21. When the clamp member 15 is now tightly secured, the floor board and the fender plate 30 will remain in proper positions, and it will be seen that as the front end of the floor board is received in the notch 32, the lower end of the plate 30 is held against lateral shifting, it being remembered that transverse movement of the foot-board upon the bars 8, is prevented by the grooves 12.

I have provided a combined fender and brake 33 for the rear wheel 5, this member being of a longitudinally curved, channel-shaped formation and having its lower end 34 suitably secured as at 35 against the bottom of the foot-board 9, said lower end being resilient so that it permits downward swinging of the member 33 into contact with the tire of the wheel 5, when it is to be used as a brake. A pair of substantially L-shaped springs 36, are provided at opposite sides of the wheel 5, the lower ends of said springs being connected with the rear extremities 7 of the bars 8, by appropriate fasteners 37, while their upper ends are connected with the combined fender and brake 33. Preferably, the two springs 36 are formed by bending a single piece of spring wire, and the portion 38 of this wire which connects said springs 36, may well pass through an upwardly stamped portion 39 of the member 33, to establish connection between said member and the springs. These springs are instrumental in normally holding the member 33 out of contact with the tire of the wheel 5, but they also form part of operating means for depressing said member into contact with the tire.

A U-shaped, combined brake actuator and stand 40 has its ends pivoted to the terminals 7 of the bars 8, the fasteners 37 being preferably utilized to establish these pivotal connections. This member 40 is swingable to either of the positions shown in Figs. 1 and 5, and it is provided with a pair of lugs 41. When the member 40 is horizontally disposed as in Fig. 1, these lugs rest upon the horizontal portions of the springs 36 and the front end of said member is then in position to be depressed by one foot of the person using the scooter. When so depressed, the lugs 41 shift the springs 36 downwardly, thus pulling the combined fender and brake 33 against the tire of the wheel 5 and forming an effective brake. When the member 40 is swung to the position of Fig. 5, the lugs 41 abut the bar ends 7 and said member then forms an effective stand for supporting the entire scooter in a vertical position.

Excellent results have been obtained from the details disclosed and they are therefore preferably followed. However, within the scope of the invention as claimed, numerous modifications may be made, and obviously any desired materials and ornamentations may be used.

I claim:—

1. A scooter comprising a steering column having a front wheel, a rear wheel, a foot-board disposed longitudinally between the front and rear wheels, a pair of longitudinal bars underlying said foot-board and having their rear ends supported by the rear wheel, the front ends of said bars being turned upwardly and pivoted to said steering column, a fender plate contacting with the rear edges of said upwardly turned bar ends, the lower end of said plate being rearwardly directed and having a notch receiving the front end of said foot-board, means for connecting the upper end of said fender plate with said upwardly turned bar ends, and means for securing said foot-board to said bars with its front end tightly seated in the notch of said fender plate.

2. A scooter comprising a steering column having a front wheel, a rear wheel, a foot-board disposed longitudinally between the front and rear wheels, a pair of longitudinal bars underlying said foot-board and having their rear ends supported by the rear wheel, the front ends of said bars being turned upwardly, a bracket secured to said upwardly turned bar ends and pivoted to said steering column, said bracket having a portion extending between said upwardly turned bar ends and provided with a downwardly projecting lug slightly in rear thereof, a fender plate contacting with the rear edges of said upwardly turned bar ends and having its upper end held between their rear edges and said lug, the lower end of said plate being rearwardly directed and abutting the front end of said foot-board, and means for securing said foot-board to said bars.

3. A structure as specified in claim 2; said upper end of said fender plate having a tongue received between said upwardly turned bar ends to hold it against lateral shifting, the lower end of said fender plate having a notch receiving the front end of said foot-board and being thereby held against lateral movement.

4. A scooter comprising a foot-board, a pair of longitudinal wheel-supported bars underlying said foot-board and having notches in their lower edges, a transverse clamp member underlying said bars and having lugs received in said notches, and means for securing said clamp member to the foot board.

5. A structure as specified in claim 4; said clamp member having upturned ends engaging said bars to positively prevent spreading thereof and to prevent canting of said member.

6. A structure as specified in claim 4; said foot-board having longitudinal grooves receiving the upper edges of said bars.

In testimony whereof I have hereunto affixed my signature.

ROMAN B. BUKOLT.